US006497937B1

(12) United States Patent
Lam et al.

(10) Patent No.: US 6,497,937 B1
(45) Date of Patent: Dec. 24, 2002

(54) WOOD BASED COMPOSITE DECKING PANEL

(75) Inventors: Frank C. F. Lam, Vancouver (CA); John D. Barrett, Vancouver (CA); Lars Peter Norlin, Laholm (SE); J M Robert Fouquet, West Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/623,114

(22) PCT Filed: Feb. 24, 1999

(86) PCT No.: PCT/CA99/00167

§ 371 (c)(1),
(2), (4) Date: Oct. 19, 2000

(87) PCT Pub. No.: WO99/43493

PCT Pub. Date: Sep. 2, 1999

(30) Foreign Application Priority Data

Feb. 24, 1998 (CA) .............................................. 2230357

(51) Int. Cl.[7] .............................................. B32B 5/12
(52) U.S. Cl. ...................... 428/106; 428/114; 428/218; 428/908.8
(58) Field of Search ................................ 428/106, 114, 428/908.8, 218; 52/177; 296/182

(56) References Cited

U.S. PATENT DOCUMENTS

| 5,041,322 A | 8/1991 | Fouquet ...................... 428/106 |
| 5,143,418 A | 9/1992 | Fouquet ...................... 296/182 |
| 5,928,735 A | * 7/1999 | Padmanabhan et al. ....... 428/33 |

FOREIGN PATENT DOCUMENTS

| EP | 0 431 734 A3 | 6/1991 |
| EP | 0 431 734 A2 | 6/1991 |

* cited by examiner

Primary Examiner—Alexander S. Thomas
(74) Attorney, Agent, or Firm—Christie, Parker & Hale, LLP

(57) ABSTRACT

An engineering wood based laminated panel for use as structural flooring for vehicle decking systems replaces a traditional hardwood decking and is cheaper plus having superior structural and wear properties. The panel has a plurality of layers in order down from a top surface, comprising a surface layer (1) having at least two high density wood veneer plies oriented parallel to one side of the panel, a load distribution layer (2) having at least one high density wood veneer ply cross oriented to the one side of the panel; a core layer (3) having from about 8 to 14 wood veneer plies oriented parallel to the one side of the panel with centre plies of the core layer being high density wood plies, and a resin impregnated reinforcement layer (4).

10 Claims, 2 Drawing Sheets

WOOD BASED COMPOSITE DECKING PANEL

In North America platform trailers, van trailers, and intermodal containers and chassis are commonly used to transport goods. The floors of these vehicles are load bearing elements required to resist repeated applications of gravity loads from wheels of lift trucks carrying goods into and out of the vehicles. The floors typically consist of wood based decking elements and steel supporting beams.

In terms of the steel supporting beams, the basic structural system of a typical platform trailer is very different from that of typical van trailers and/or intermodal containers and chassis. Usually there are two main steel girders spaced 1.2 m apart and two smaller C-channels spaced 2.4 m apart, running along the length of a platform trailer. Perpendicular to the length of the trailer, light weight high strength steel I-beams are mounted onto the main girders forming the basic steel supporting elements. These heavy girder elements stiffen the floor and allow weaker wood based flooring panels to be used effectively to service the applied loads. Van trailers and/or intermodal containers and chassis, however, usually only consist of two small C-channels running along the length of the vehicle spaced 2.4 m apart. In effect this monocoque construction require stronger flooring material to be used effectively to service the applied loads.

The flooring panels are subjected to loading from wheels of lift trucks carrying goods into and out of the vehicles. Such loading results in shear and bending stresses in the flooring panels. Throughout the panel depth, the shear stress is highest close to the neutral axis near the centre of the panel and very small close to the edges. The bending stress, on the other hand, is zero at the neutral axis near the centre of the panel and reaches maximum value at the edge. Consequently, two common failure modes are encountered with laminated wood panels in flooring applications: shear failure near the centre of the panel or bending tension failure at the bottom face of the panel.

Hardwood species are traditionally used for vehicle decking, either a tropical species group Apitong or laminated oak. These species have superior structural and wear and tear properties compared to softwood species. In the late 80's the continued availability of the hardwoods at a reasonable price became an issue. Furthermore, if alternate vehicle decking made from less dense softwoods were available, it would be possible to increase vehicle payloads which is an important cost incentive for the vehicle owners.

Existing softwood based panels can fulfil the industry requirements for service on platform trailers but have not been able to meet the structural requirements of the larger van trailers and intermodal containers and chassis market. The structural requirements on the flooring as stipulated by the Truck and Trailer Manufacturer Association (TTMA) consist of carrying a repeatedly applied front axle load for 3000 cycles without failure. The load rating for the van trailers and intermodal containers market spans from 73 kN to 107 kN front axle load.

U.S. Pat. No. 5,041,322 and No. 5,143,418 both to Fouquet disclose veneer flooring panels for trucks made from softwood Douglas-fir veneers pressed and bonded together by a resin to form panels of at least 11 veneers. The majority of veneers are arranged with the face grain oriented along the longitudinal direction of the panel with two cross ply veneers toward the upper and lower edges of the panel to provide stability and a small load carrying capacity in the width direction. Panels constructed according to this arrangement and tested under bending in the longitudinal direction typically fail in rolling shear in the cross plies. These results indicate that this panel does not meet the TTMA requirements.

Applicant has developed an engineered wood based laminated panel that addresses the shortcomings of the prior art. The panel of the present invention has been developed for use as structural flooring material in transportation vehicles via attachment to the steel frame of the vehicle. The panel has a unique structure that mixes high and low density veneers and resin impregnated reinforcements to create a panel of superior strength that is able to meet the structural requirements specified by the TTMA.

According to one embodiment of the invention, there is provided a wood based laminated panel with a plurality of layers in order down from a top surface, comprising: a surface layer having at least two high density wood veneer plies with the grain oriented parallel to one side of the panel; a load distribution layer having at least one high density wood veneer ply with the grain cross oriented to the one side of the panel; a core layer having from about 8 to 14 wood veneer plies with grain orientation parallel to the one side of the panel with high density wood plies, and a resin impregnated reinforcement layer.

In another embodiment there is provided a method of manufacturing the wood based laminated panel as described comprising the steps of coating the veneer plies with resin, arrange the plies in a predetermined lay-up together with the resin impregnated reinforcement layer; lacing a resin impregnated paper layer on top of the lay-up, and pressing the lay-up together at predetermined temperature and pressure to cure the resin and form the panel.

In drawings which illustrate embodiments of the invention,

Figure 1A:
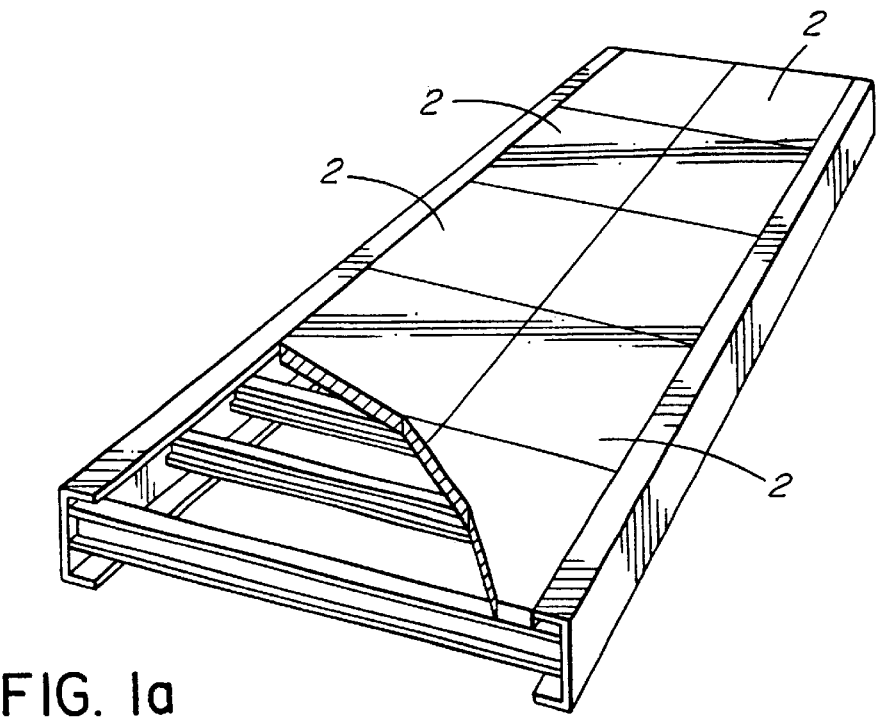
FIGS. 1a and 1b are schematic views showing vehicle decking systems.
Figure 1B:
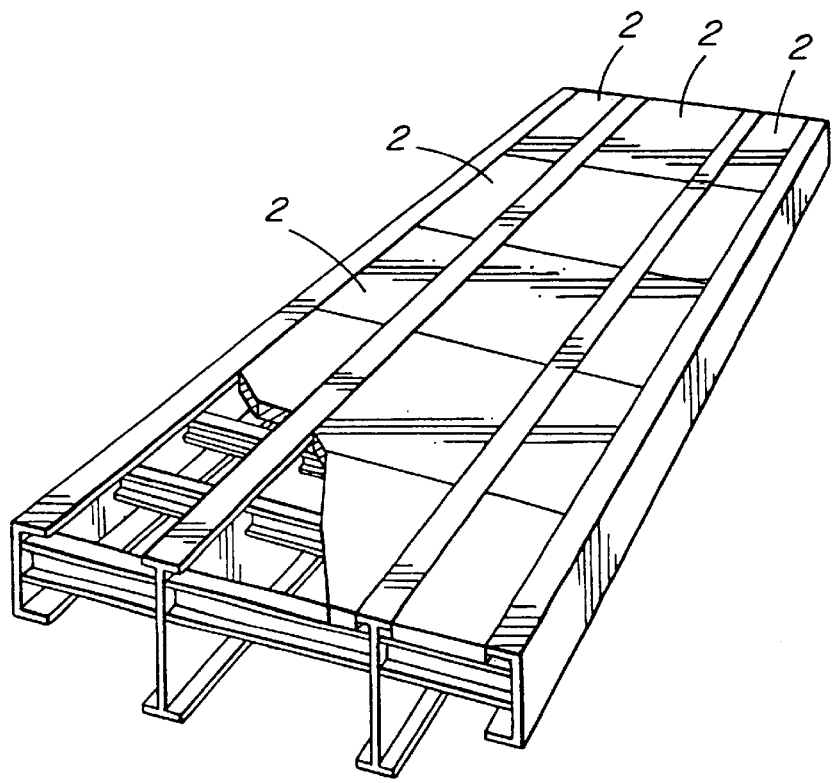
Figure 2A:
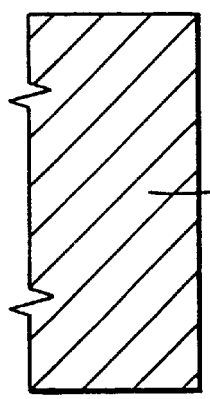
FIGS. 2a, 2b and 2c are schematic views showing a cross-section of the panel, a shear stress diagram and a bending stress diagram for a panel, respectively.
Figure 2B:
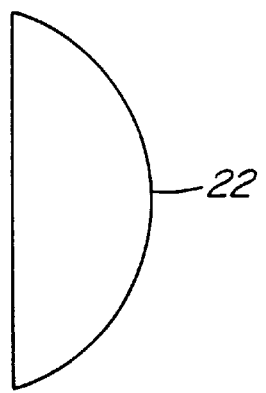
Figure 2C:
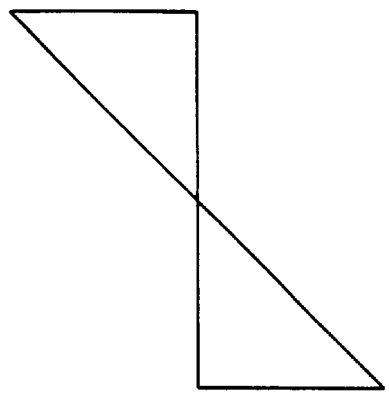

A typical van trailer structure is shown in FIG. 1a which differs from the structure of a platform trailer shown in FIG. 1b. The flooring panels 2 are subjected to loading from wheels of lift trucks and the like. FIG. 2a shows a cross-section through an edge of a panel 2 according to the present invention. FIGS. 2b and 2c are shear and bending stress diagrams over the cross-section of the flooring panel showing the stresses resulting from the loading of the panel.

Figure 3:
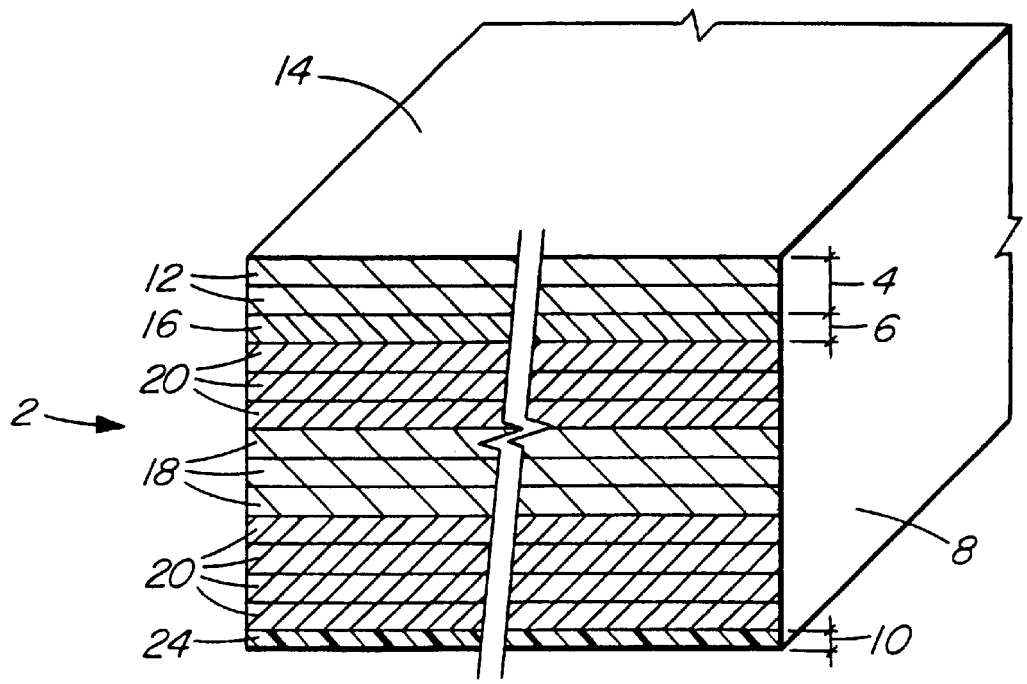
FIG. 3 is a panel cross-sectional view showing the layers according to one embodiment of the invention.

The panel has been engineered such that a desired mode of failure and maximum load capacity is achieved. In one embodiment the panel is made up of thirteen layers of 2.54 mm thick laminated veneers and an additional reinforcement layer. The veneer layers can be divided into three basic components; surface layer 4, load distribution layer 6, and core layer 8 as shown in FIG. 3. Each component has a specific role to fill with regard to the over all load carrying capacity of the panel.

Typically the loads transferred to the panel surface from the wheels of lift trucks are highly concentrated and very abrasive to the panel surface. Hence, the surface layer 4 is made up from veneer layers with high density to improve the wear and tear resistance of the panel. The surface layer preferably consists of two 2.54 mm thick Birch veneers 12 oriented parallel to the long side 14 of the panel (parallel plies).

In order to improve load carrying capacity of a panel, it is imperative that the load is distributed to as large a volume of material as possible. The load distribution layer 6 consists of a single layer of birch veneer 16 oriented such that its fibre direction is perpendicular to the parallel plies (cross ply). A cross ply has lower shear strength than parallel plies, therefore, in order to avoid shear failures of the load distribution layer, the cross ply consists of a high density veneer with higher shear strength.

The function of the core layer 8 is to carry the shear stresses. Another important function of the core is to increase the rigidity of the panel without making it too heavy. Rigidity is partly obtained by an increase of the panel depth. The core consists of two types of veneers, higher density 18 (birch) and lower density 20 (Douglas fir) veneers both oriented with the grain parallel to the long side of the panel. The lower density veneers are weaker in shear compared to the higher density veneers, but offer weight and cost savings which is an important criteria for vehicle flooring. The veneers in the core layer are arranged in a 3 Douglas fir –3 birch –4 Douglas fir scheme such that the higher density birch veneers are placed in the zone 22 (FIG. 2b) where the highest shear stresses can be expected.

The main function of the reinforcement layer 10 is to carry the majority of the bending tension stresses. The reinforcement layer also adds additional stiffness to the panel and because of its high load strength it eliminates the bending tension failure mode and forces the panel to fail in shear under high loads. The reinforcement layer consist of glass fibre fabric 24 saturated by an epoxy resin.

Examples of materials and veneer species that can be used in the various panel components are:

Surface layer: birch, oak, beech, tropical hardwoods, Douglas-fir, western hemlock, pine, spruce, KEVLAR[1]*, carbon, fibre-glass, nylon, vinyl, and aluminum Load distribution layer: birch, oak, beech, tropical hardwoods, Douglas-fir, western hemlock, pine, spruce, KEVLAR*, carbon, nylon, vinyl, and fibre-glass Core layer: birch, oak, beech, tropical hardwoods, Douglas-fir, western hemlock, spruce, and pine.

[1]*DuPont's trade-mark for organic fibre in the aromatic polyamide family.

The reinforcement layer can be made up from of KEVLAR*, carbon, nylon, vinyl, or glass fibres saturated by epoxy, phenol formaldehyde, melamine formaldehyde, phenol resorcinol formaldehyde, urea formaldehyde, or polyester resin according to preference.

By making adjustments to the various components of the panel, the load carrying capacity of the panel can be adjusted to fit the high or low ends of the market. This can be achieved by:

1) Altering veneer thickness (1.5 mm to 3.2 mm). The thicker the veneer, the greater the strength.
2) Changing the number of veneers in the core layer (8 to 14).
3) Changing the species of the veneers in the core layer. Higher density veneers result in a higher strength core.
4) Changing the properties of the reinforcement layer in terms of material/resin combination and/or layer thickness.

Consequently, variants of the panel can be manufactured to service the various load sectors of the market. In order to achieve load carrying capacity for the high end market (107 kN (24,000 lbs) load rating) an additional reinforcement layer on the top of the panel (above the surface layer) can be used.

The panel is manufactured in a standard plywood mill. The procedure follows with the exception of the reinforcement layer the normal manufacturing process of a plywood panel. The Veneers are initially coated with a phenol formaldehyde resin and arranged in the predetermined lay-up together with the resin impregnated reinforcement layer on the bottom and a resin impregnated paper layer on top. Then, the stack is pressed together under high temperature (130° C.–170° C.) and pressure (1.2 MPa–1.5 MPa) until the resin has cured and a panel has been formed in a single stage process. The resin impregnated paper layer is used to provide the panel, with moisture resistance. When the panel has cooled down the edges are squared off and supplied with a moisture sealant.

The manufacturing procedure is, however, susceptible, to changes. It is possible to use a two stage process to manufacture the panel; first hot-press the-veneers together and later add the reinforcement layer by manual method or by hot-pressing. Another option is the use of a continuous press for manufacture of over sized panels. An additional wood veneer layer may be applied at the bottom of the panel at the time of the press such that the reinforcement layer is sandwiched between two veneer layers. The additional wood veneer ply does not fulfil. any structural purposes but is used to protect the press platens from resin. This can also be achieved by adding, a second resin impregnated paper layer to the bottom of the stack at the time of the press.

The development work took place in a laboratory environment with testing performed to evaluate performance of the panels constructed according to the present invention with existing designs such as those disclosed in U.S. Pat. No. 5,143,418 and U.S. Pat. No. 5,041,322 to Fouquet. For practical and economical reasons, the majority of the tests have focused on the evaluation of the short term strength of small scale test specimens (10 cm wide and 40 cm long). Performance was evaluated by simply supporting the specimens over a 30 cm span and subjecting them to a centre point load until failure.

Table 1 shows the results of testing conducted on specimens of the present invention and on specimens constructed according to the design of the U.S. Patents mentioned above.

| Test | Number of Specimens | Average Load kN (lb) | Bending Strength MPa | Shear Strength | |
|---|---|---|---|---|---|
| | | | | (RS) MPa | (LS) MPa |
| Prior art panel 1 | 15 | 15.8 (3554) | — | 2.48 | — |
| Prior art panel 2 | 20 | 15.3 (3437) | — | 2.53 | — |
| Inventive panel | 25 | 21.0 (4715) | 68.72 | — | 4.38 |

RS = Rolling shear
LS = Longitudinal shear

Prior art panel specimens 1 and 2 were panels consisting of 15 layers of 2.5 mm (1/10 inch) Douglas-fir veneer substantially as disclosed in U.S. Pat. No. 5,041,322 and U.S. Pat. No. 5,143,418 having a 4 ply-crossply-5 ply-crossply-4 ply lay-up scheme. Two separate series of tests were run to verify the results. The two series results compare well. The specimens failed predominantly in rolling shear mode.

The tested panel specimens of the present invention consisted of thirteen layers of 2.5 mm (1/10 inch) veneers organized as follows: 2 birch ply-1 birch crossply-3 Douglas fir ply-3 birch ply-4 Douglas fir ply-1 reinforcement ply. The reinforcement layer was made up of three layers of pre-impregnated 0.25 mm (1/100 inch) fabric. The panels were manufactured in two stages with the reinforcement layer being added by hot press in a second stage at a temperature of 150° C. for 30 minutes under a pressure of 345 kPa (50 psi). The panel specimens failed predominantly in longitudinal shear in layer 10 counted from the top of the panel. Since specimens failed in both longitudinal shear and bending tension, both the bending strength and longitudinal shear strength values have been included.

Based on the test results, an understanding of the failure behaviour of laminated soft wood panels has been established and different modes of failure have been identified. The above tests of small panel specimens indicate a substantial increase in short term load capacity of approximately 37% compared to the prior art soft wood based panels. Such increase in short term capacity is judged to allow the panel to compete structurally with the traditional hardwood flooring.

The novel panel design of the present invention uses the reinforcement layer to lower the panel neutral axis and to provide additional tensile capacity under bending. The cross ply, which is required to stabilize the panel, is positioned near the top of the construction in the compression zone (under bending loads). By lowering the neutral axis and placing the cross ply closer to the top, the panel design effectively puts the weakest link into a low stress zone and forces the panel to fail in longitudinal shear mode under higher loads. Furthermore, high density veneers (birch) which have a high shear strength are positioned near the neutral axis where longitudinal shear stresses are highest. Birch veneers are also positioned at the top of the panel where concentrated wheel loads are applied. The denser birch veneer provides more resistance against day to day wear as compared less dense material such as Douglas-fir.

A sample of full scale (1.2 m wide and 2.4 m long) prototype panels were manufactured in a plywood mill. The mill trial experience indicated that the panel can indeed be manufactured in a mill environment with little modification to the current production method of the mill.

Prototype panels were installed into three vehicles for field testing. Close records of the loads applied to the decking have been kept. So far the vehicles have been in services for up to twelve months and good performance in terms of durability and load carrying capacity has been reported.

Various changes may be made to the embodiments shown herein without departing from the scope of the present invention which is limited only by the following claims.

We claim:

1. A wood based laminated panel with a plurality of layers arranged in a cross-section between a top surface and a bottom surface, in order down from the top surface to the bottom surface, comprising:
   a surface layer having at least two high density wood veneer plies with grain orientation parallel to one side of the panel;
   a load distribution layer having at least one high density wood veneer with the grain cross oriented to the one side of the panel;
   a core layer having from about 8 to 14 wood veneer plies with the grain oriented parallel to the one side of the panel with centre plies of the core layer being high density wood plies and the outer plies being low wood density plies; and
   a resin impregnated reinforcement layer, wherein the plurality of layers arranged in a cross-section have a non-synmmetric configuration from the top surface to the bottom surface with the load distribution layer positioned adjacent the top surface.

2. The wood based laminated panel according to claim 1 wherein the core layer comprises wood veneer plies selected from the group consisting of birch, oak, beech, tropical hardwoods, Douglas fir, western hemlock, spruce and pine.

3. The wood based laminated panel according to claim 2 wherein the core layer has three high density wood veneer plies sandwiched between three top and four bottom low density wood veneer plies.

4. The wood based laminated panel according to claim 3 wherein the high density wood veneer plies are birch and the low density wood veneer plies are Douglas fir.

5. The wood based laminated panel according to claim 1 wherein the surface layer comprises high density wood veneer plies selected from the group consisting of birch, oak, beech, tropical hardwoods, Douglas fir, western hemlock, pine and spruce.

6. The wood based laminated panel according to claim 1 wherein the load distribution layer comprises at least one high density wood veneer ply selected from the group consisting of birch, oak beech, tropical hardwoods, Douglas fir, western hemlock, pine and spruce.

7. The wood based laminated panel according to claim 1 wherein the reinforcement layer is selected from the group consisting of organic fibre in the aromatic polyamide family, carbon, nylon, vinyl and glass fibres saturated with a resin selected from the group consisting of epoxy, phenol formaldehyde, melamine formaldehyde, phenol resorcinol formaldehyde, urea formaldehyde, and polyester.

8. The wood based laminated panel according to claim 1 including an additional reinforcement layer on the top surface of the panel.

9. The wood based laminated panel according to claim 8 wherein the additional reinforcement layer is selected from the group consisting of organic fibre in the aromatic polyamide family, carbon, nylon, vinyl and fibre-glass.

10. A wood based laminated panel with a plurality of layers in order down from a top surface, comprising:
    a surface layer having at least two high density wood veneer plies with grain orientation parallel to one side of the panel;
    a load distribution layer having at least one high density wood veneer with the grain cross oriented to the one side of the panel;
    a core layer having from about 8 to 14 wood veneer plies with the grain oriented parallel to the one side of the panel with centre plies of the core layer being high density wood plies; and
    a resin impregnated reinforcement layer, wherein the load distribution layer is selected from the group consisting of organic fibre in the polyamide family, carbon, nylon, vinyl and glass fibres saturated with a resin selected from the group consisting of epoxy, phenol formaldehyde, melamine formaldehyde, phenol resorcinol formaldehyde, urea formaldehyde, and polyester.

* * * * *